(12) United States Patent
Mihelič

(10) Patent No.: US 7,632,034 B2
(45) Date of Patent: Dec. 15, 2009

(54) RELEASABLE SECURING APPARATUS AND METHOD OF USING SAME

(75) Inventor: Miko Mihelič, Dobrova (SI)

(73) Assignee: Studio Moderna SA, Lugano (CH)

( * ) Notice: Subject to any disclaimer, the term of this patent is extended or adjusted under 35 U.S.C. 154(b) by 0 days.

(21) Appl. No.: 11/867,616

(22) Filed: Oct. 4, 2007

(65) Prior Publication Data

US 2008/0023936 A1 Jan. 31, 2008

Related U.S. Application Data

(62) Division of application No. 10/956,669, filed on Oct. 1, 2004, now Pat. No. 7,290,956.

(51) Int. Cl.
*B62K 15/00* (2006.01)

(52) U.S. Cl. ............... 403/66; 403/314; 403/322.1; 403/322.4; 280/287

(58) Field of Classification Search ............ 280/278, 280/287
See application file for complete search history.

(56) References Cited

U.S. PATENT DOCUMENTS

| | | | |
|---|---|---|---|
| 599,859 A | 3/1898 | McFadden | |
| 645,145 A | 3/1900 | Trebert | |
| 2,417,646 A | 3/1947 | Hallner | |
| 3,345,092 A | 10/1967 | Athman et al. | |
| 3,722,913 A | 3/1973 | Housayama | |
| 3,814,462 A | 6/1974 | Kelly | |
| 4,002,351 A | 1/1977 | Zuck | |
| 4,022,485 A * | 5/1977 | Cox | 280/287 |
| 4,029,326 A | 6/1977 | Blow, Jr. | |
| 4,067,589 A | 1/1978 | Hon | |
| 4,438,942 A | 3/1984 | Hon | |
| 4,440,414 A | 4/1984 | Wang | |
| 4,441,729 A | 4/1984 | Underwood | |
| 4,448,435 A | 5/1984 | Hon | |
| 4,460,191 A | 7/1984 | Ishibashi et al. | |
| 4,598,923 A | 7/1986 | Csizmadia | |
| 4,718,688 A | 1/1988 | Sanders | |
| 4,995,626 A | 2/1991 | Montague | |

(Continued)

FOREIGN PATENT DOCUMENTS

BE 628783 A 6/1963

(Continued)

OTHER PUBLICATIONS

Machine translation of JP 2002-200995.*

(Continued)

*Primary Examiner*—Kevin Hurley
(74) *Attorney, Agent, or Firm*—Mitchell P. Brook; Luce, Forward, Hamilton & Scripps

(57) ABSTRACT

A securing apparatus that releasably secures two or more mechanical elements is provided. The securing apparatus may be attached to one mechanical element and include abutment surfaces that abut at least one additional mechanical element. Forces exerted by the at least one additional mechanical element and the securing apparatus on each other serve to maintain the securing apparatus in an engaged position. The securing apparatus may include a locking member that includes a protruded portion that extends at least partially beneath the securing apparatus and at least one mechanical element. A pull-ring may be provided to rotate the locking member and release the mechanical elements being secured.

12 Claims, 6 Drawing Sheets

U.S. PATENT DOCUMENTS

| | | | |
|---|---|---|---|
| 5,125,678 A | 6/1992 | Bogen | |
| 5,301,972 A | 4/1994 | Lee | |
| 5,440,948 A | 8/1995 | Cheng | |
| 5,873,590 A | 2/1999 | Abe et al. | |
| 5,906,452 A | 5/1999 | Lee | |
| 6,139,038 A | 10/2000 | Santa Cruz et al. | |
| 6,279,935 B1 | 8/2001 | Wagner | |
| 6,293,575 B1 | 9/2001 | Burrows et al. | |
| 6,347,803 B1 | 2/2002 | Berges | |
| 6,394,478 B1 | 5/2002 | Balajadia | |
| 6,425,598 B2* | 7/2002 | Murayama | 280/278 |
| 6,561,724 B1* | 5/2003 | Carletti | 403/315 |
| 6,612,597 B2 | 9/2003 | Baker et al. | |
| 6,886,845 B2* | 5/2005 | Chao | 280/278 |
| 6,979,012 B2* | 12/2005 | Sherman | 280/278 |
| 7,229,089 B2* | 6/2007 | Mihelic | 280/278 |

FOREIGN PATENT DOCUMENTS

| | | |
|---|---|---|
| CH | 677215 A5 | 4/1991 |
| DE | 1106626 B | 5/1961 |
| DE | 4313832 A | 11/1994 |
| DE | 10032105 A1 | 1/2001 |
| DE | 10240194 A1 | 3/2003 |
| DE | 20300031 U1 | 4/2003 |
| EP | 0026800 A1 | 4/1981 |
| EP | 0565760 A1 | 10/1993 |
| EP | 0965517 A2 | 12/1999 |
| EP | 1069036 B2 | 1/2001 |
| FR | 1011990 A | 7/1952 |
| FR | 2664228 A1 | 1/1992 |
| FR | 2827829 A1 | 1/2003 |
| FR | 2830230 A1 | 4/2003 |
| GB | 526773 A | 9/1940 |
| GB | 1484143 | 8/1977 |
| GB | 1580048 | 11/1980 |
| GB | 2144687 A | 3/1985 |
| GB | 2289874 A | 12/1995 |
| GB | 2296224 A | 6/1996 |
| GB | 2373770 A | 10/2002 |
| GB | 2377207 A | 1/2003 |
| GB | 2401589 A * | 11/2004 |
| JP | 08-133160 A | 5/1996 |
| JP | 08-198167 A | 8/1996 |
| JP | 09-207858 A | 8/1997 |
| JP | 10-119866 A | 5/1998 |
| JP | 10-152085 A | 6/1998 |
| JP | 10-194179 | 7/1998 |
| JP | 11-005582 A | 1/1999 |
| JP | 2000-062672 A | 2/2000 |
| JP | 2002-200995 A | 7/2002 |
| KR | 20-0164478 | 2/2000 |
| SU | 472054 | 4/1971 |
| SU | 569476 | 8/1977 |
| SU | 580138 | 11/1977 |
| SU | 710861 | 3/1978 |
| SU | 1527083 | 12/1989 |
| SU | 595196 | 10/2007 |
| WO | WO 99/05021 | 2/1999 |
| WO | 99/38759 A1 | 8/1999 |
| WO | 00/05128 A1 | 2/2000 |
| WO | 01/38165 A1 | 5/2001 |
| WO | 2004/024546 A1 | 3/2004 |

OTHER PUBLICATIONS

Brompton Bicycle Ltd., "The Choice of Bikes," www.bromptonbicycle.co.uk, Dec. 31, 2002 or earlier (6 pages).
Green Gear Cycling Inc., "Bike Friday Performance that Packs," www.greengear.com, Dec. 21, 2002 or earlier (1 page).
Strida Folding Bicycles, "Leading Edge Design," www.strida.com/folding_bicycle.html, Dec. 31, 2002 or earlier (1 page).
Dahon, "Folding Bikes," www.dahon.com, Dec. 31, 2002 or earlier (5 pages).
Montague Corporation, "Full Size High Performance Bicycles that Fold," www.montagueco.com/message.html, Dec. 31, 2002 or earlier (1 page).
Steven M. Scharf, "Folding Bicycle Information," http://nordicgroup.us/fold/, Dec. 31, 2002 or earlier.
International Search Report for PCT/EP2005/054926, dated Feb. 1, 2006.

* cited by examiner

RELEASABLE SECURING APPARATUS AND METHOD OF USING SAME

The present application is a divisional application of U.S. patent application Ser. No. 10/956,669, filed on Oct. 1, 2004, the disclosure of which is hereby incorporated in its entirety by reference.

FIELD OF THE INVENTION

The present invention generally relates to a securing apparatus releasably securing two or more mechanical elements, and a method of operation.

BACKGROUND OF THE INVENTION

Devices for securing mechanical elements are known. Such devices include clamps, nuts and bolts, screws, staples, rivets, etc. Some of these devices require maintaining multiple mechanical elements in a particular relation to ensure that the mechanical elements are secured in a desired manner. This may be difficult if there is only one operator securing the mechanical elements. For example, an operator may be required to hold a bolt with one hand and/or a tool while using another hand or tool to rotate a nut onto the bolt. This may be awkward depending on a location of the bolt and nut.

Additional devices may be required to assist an operator in maintaining the mechanical elements in a desired position. For example, there may be difficulty in orienting the elements in a required securing position. Therefore, the operator may require other devices to assist in maintaining one or more of the mechanical elements in the desired position. Such additional devices can include clamps, pliers or other gripping devices. Additional disadvantages include the amount of time required for securing the components, slippage and the requirement for sufficient space for working to secure the mechanical elements as desired.

Moreover, securing elements requiring complexity or dexterity to operate can be unnerving to use where speed is desired. For example, a screw and nut type of securing apparatus can be unnerving to use, even if a relatively short period is required to operate the screw and nut mechanism, since it requires threading the nut onto the bolt and then turning the nut (or bolt) to secure the mechanism.

Thus, there exists a need for a securing apparatus that is optionally self-orienting, and relatively easy to operate and release.

SUMMARY OF THE INVENTION

The present invention alleviates, to a great extent, the disadvantages of known securing apparatus, by providing a securing system releasably securing two or more mechanical elements in a relatively fixed orientation. One embodiment of the present invention includes a securing apparatus that can be used with a foldable bicycle to releasably secure one or more of its elements. However, it will be appreciated that the apparatus can be used to releasably secure any type of elements.

The securing apparatus includes a substantially rigid member, which is referred to herein as a plate or hinged plate. The plate is rotatably or pivotally mounted on at least one of the mechanical elements such as by using a hinge assembly. The plate has abutment surfaces. The abutment surfaces of the plate are adapted to engage corresponding engagement surfaces of one or more of the components being secured, i.e., components other than the component(s) to which the plate is hingedly mounted. Preferably the securing apparatus includes a biasing mechanism that biases the plate towards an engaged position.

Another aspect of the invention is a locking assembly that secures the plate and the component in the engaged position. The locking assembly can include a locking member, which includes an engagement portion extending therefrom. The engagement portion overlaps a portion of at least one of the abutment surfaces when the locking assembly is in the locked or secured position. That way, the engagement surface(s) and corresponding abutment surface(s) are retained in position. Likewise in the locked position, preferably the abutment and corresponding engagement surfaces exert opposite and opposing forces on one another, thereby resulting in self-orienting biasing forces. A locking member biasing assembly is optionally provided to bias the locking member in the secured position.

In another aspect of the invention, the securing apparatus is operated to disengage by moving the locking member relative to the plate such that its engagement portion is clear of the corresponding abutment surface. The hinged plate is then rotated about its hinge such that the abutment surface(s) and corresponding engagement surface(s) are clear of one another, i.e., disengaged from each other.

In one embodiment of the invention, the securing apparatus is used to secure two or more components of a foldable bicycle in a riding position. For example, the hinged plate may be rotatably mounted by a hinge assembly to one or more top tubes of a foldable bicycle, adjacent the seat tube. The hinged plate is secured to the top tube(s) such that the hinge plate may be rotated from the engaged position to a clear, i.e. disengaged position.

The locking member in this embodiment is rotatably attached to the hinged plate by a pivot assembly. The locking member includes a protruding engagement portion such that when the securing apparatus is in the secured position, the engagement portion extends at least partially beneath one of the abutment surfaces of the hinged plate. The locking member also includes a biasing assembly that biases the engagement portion of the locking member in a direction toward the secured position. The locking member also may include a grappling structure, such as a pull-ring. The pull-ring enables an operator to rotate the locking member about the pivot between the locked and unlocked positions.

To releasably secure seat stays of the foldable bicycle, abutment surfaces of the hinged plate are aligned to mate with corresponding engagement surfaces at the ends of the seat stay(s) of the foldable bicycle. The hinged plate is moved downwardly toward the ends of the seat stays. The forces exerted by the abutment surfaces and the corresponding engagement surfaces of the seat stay(s) on each other serve to lock the securing apparatus in place. In a preferred embodiment, the surfaces are slightly angled off perpendicular so as to further secure and orient their relative positions. To release the securing apparatus, an operator rotates the optional locking member in a direction relative to the hinged plate until the engagement portion is no longer beneath the hinged plate.

The locking member and hinged plate together are moved in an unlocking direction (e.g., upwards) to cause the hinged plate to rotate about its hinge to a disengaged position. This causes the abutment surface(s) of the hinged plate to disengage from the corresponding engagement surface(s) of the seat stays, allowing the seat stays to move. Thus it is seen that the seat stays are releasably secured in a fixed relation to the top tube(s) and/or seat and/or seat tube and/or frame of the folding bicycle.

Although a preferred embodiment of the present invention is used in conjunction with a foldable bicycle, it should be appreciated that the present invention may be used for any structure where it is desired to releasably secure two or more mechanical elements. For example, the securing apparatus may be used to releasably secure components in foldable motorcycles, strollers, trolleys, box covers, container door locks, specialty furniture, windows, doors, military equipment, airplanes or other applications where two or more mechanical elements may be releasably secured.

The securing apparatus preferably is structured for operation without using any tools and may securely lock the two or more mechanical elements in a desired position.

These and other features and advantages of the present invention will be appreciated from review of the following detailed description of the invention, along with the accompanying figures in which like reference numerals refer to like parts throughout.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the drawings. Throughout this description, the preferred embodiment and examples shown should be considered as exemplars, rather than as limitations on the present invention. As used herein, the "present invention" refers to any one of the embodiments of the invention described herein, and any equivalents. Reference to various feature(s) of the "present invention" throughout this document does not mean that all claimed embodiments or methods must include the referenced feature(s).

The present invention relates to a securing apparatus (also referred to as "assembly") releasably securing two or more mechanical elements. According to one embodiment of the present invention, the securing apparatus may be used to releasably secure portions of a foldable bicycle to one another. However, it should be noted that the securing apparatus of the present invention may be used in any application in which it is desired to secure two or more elements to one another. Examples of applications of the securing apparatus are in securing elements in motorcycles, strollers, trolleys, box covers, container door locks, specialty furniture, windows, doors, military equipment, airplanes or other applications where two or more mechanical elements may be releasably secured.

Figure 1:
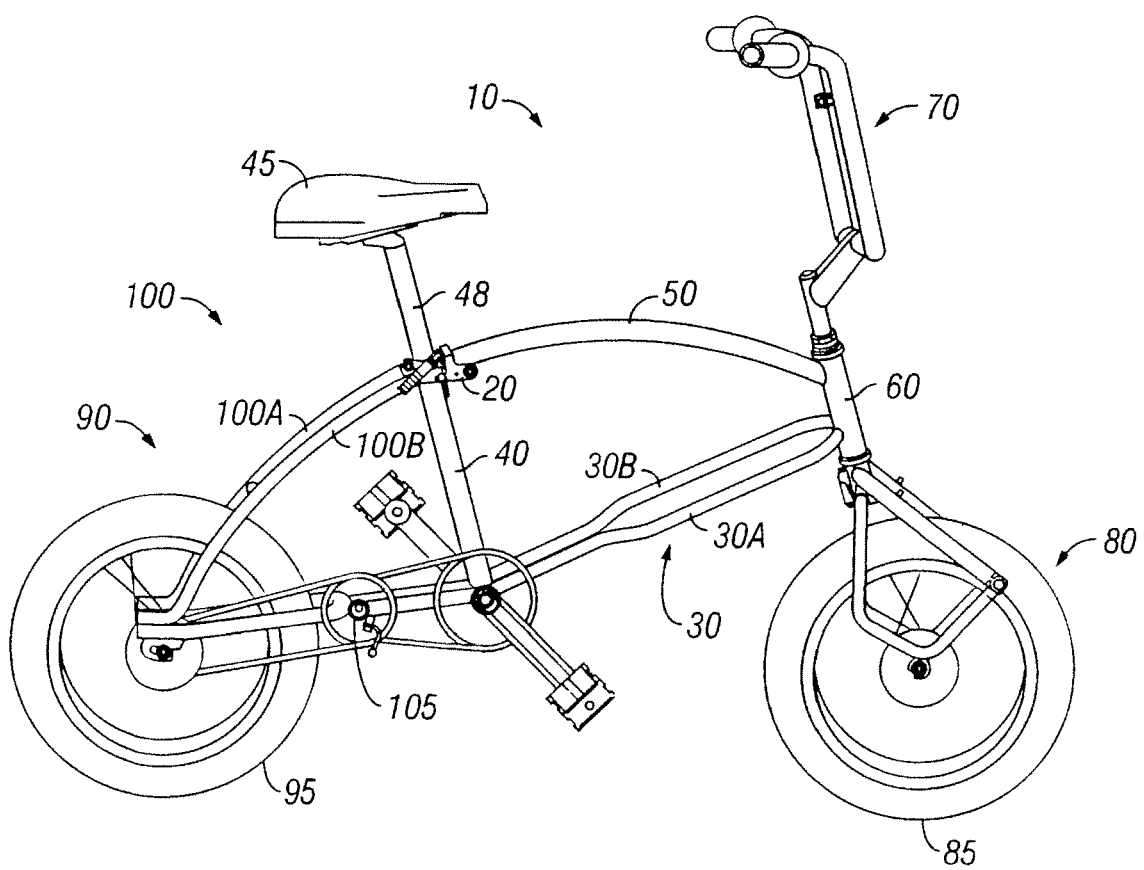
FIG. 1 is a side view of an embodiment of a foldable bicycle in accordance with one embodiment of the present invention.

An example of a foldable bicycle 10 including one example of a securing apparatus 20 of the present invention is illustrated in FIG. 1. The foldable bicycle 10 can have any construction. As one example, the bicycle has a frame including frame elements such as optionally a down tube 30 assembly that optionally may include spatially separated tubes 30A, 30B, a seat tube 40 corresponding to the tube beneath the seat 45 and into which the seat post 48 can slidably fit, a top tube assembly 50 optionally including separated top tubes, and a bearing tube 60. One end of the top tube 50 is attached to the bearing tube 60, as is one end of the down tube assembly 30. If a single down tube 30 is used, the single down tube may be provided with a split in the middle as well in effect creating a split down tube. The split may be shaped to accommodate a front wheel of the foldable bicycle 10 when the front wheel is in a folded position.

The foldable bicycle 10 may also include a handlebar assembly 70 that is foldable. The handlebar assembly is rotatably mounted to the bearing tube 60, as is the front wheel assembly 80. Optionally the front wheel assembly 80 is foldable in some fashion so as to bring the front wheel 85 into closer proximity to the down tube 30 than it is in the unfolded position illustrated in FIG. 1. In one embodiment the front wheel assembly 80 is foldable such that the front wheel 85 can be positioned adjacent the down tube 30, such as between the two tubes 30A and 30B. The down tubes 30A, 30B preferably have a gap between them, which is sufficiently wide to accommodate a front wheel of the foldable front wheel assembly 80. A foldable rear wheel assembly 90 is also provided, which is foldable such that the rear wheel 95 is moved closer to the seat tube 40 than it is when in the unfolded position. Although a single top tube 50 is shown in FIG. 1, spatially separated top tubes also may be used. The foldable rear-wheel assembly 90 may include one or more seat stays 100A, 100B.

In an example discussed herein, the securing apparatus 20 is used to releasably secure a seat stay assembly 100 (also referred to as the "seat stays" 100, 100A and/or 100B or "seat stay") to the bicycle frame, such as at seat tube 40 and/or the top tube assembly 50 and/or the downtube assembly 30. In brief summary of the operation of this particular embodiment, in order to fold the rear wheel assembly 90, the securing apparatus 20 is operated to release the seat stay assembly 100 from a fixed relation connection to the frame of the bicycle (and the seat tube 40 and/or the top tube assembly 50) to allow the wheel 95 to rotate about a pivot location (illustrated with reference number 105) into a fold position. In order to restore the bicycle 10 to a riding position, the seat stays 100A and 100B can be restored to a secure position using the securing apparatus 20. It should be noted that the pivot location can be situated at any location wherein the rear wheel 95 can be moved relative to the frame of the bicycle.

Figure 2:
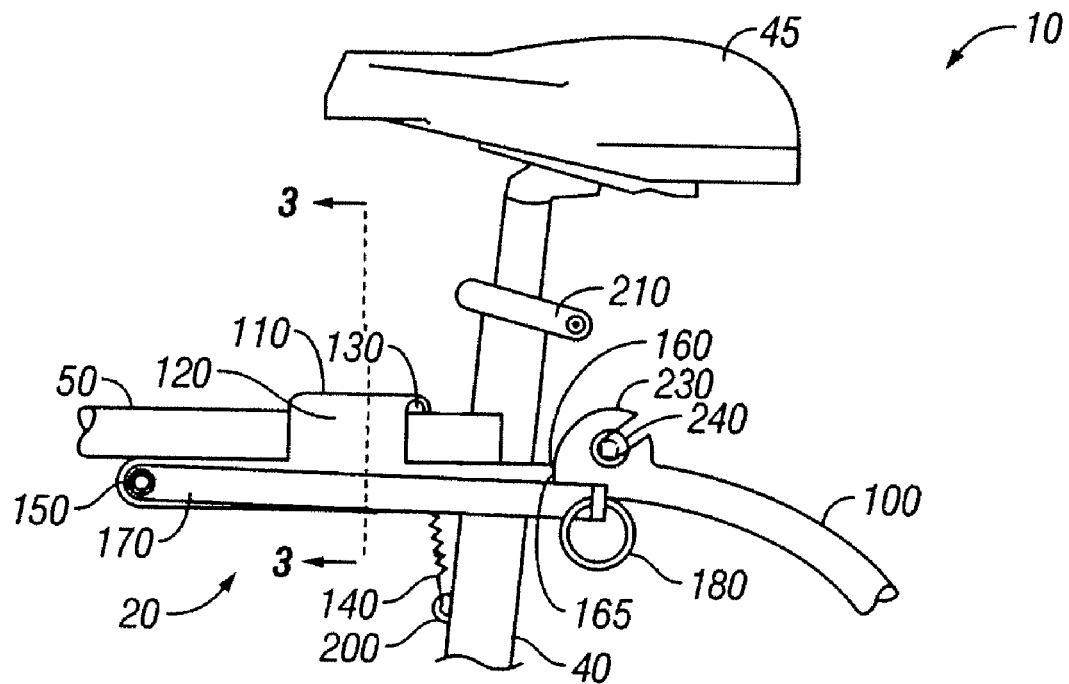
FIG. 2 is a side view of a securing apparatus for a foldable bicycle in accordance with one embodiment of the present invention.

FIG. 2 is a side view of an embodiment of a releasable securing apparatus 20 in a engaged position used in conjunction with a foldable bicycle 10 according to one embodiment of the invention. The securing apparatus 20 includes a securing member 110, which also is referred to as a "rigid member", a "plate", a "plate member" or a "hinged plate member". This securing member 110, refers to any element with sufficient structural strength to secure the securing apparatus 20 and withstand the forces applied during typical or expected use. Although a particular example of a structure is used herein, it should be understood that other structural shapes and arrangements can be used. The hinged plate member 110 optionally has a raised portion 120 and a biasing assembly mounting location 130, also called a first eyelet 130, hinged plate biasing member 140, hinge assembly 150, abutment surfaces 160, locking assembly including locking member 170, and grappling structure 180 (also called a "pull-ring") in the illustrated embodiment. The seat tube 40 optionally has a biasing assembly mounting location 200, which will be referred to as second eyelet 200. The foldable bicycle 10 may include any known seat clamp 210 and seat 45. The foldable bicycle 10 may also include one or more seat stays 100 having an optionally curved connector portion 230. The connector portion 230 engages a connecting rod 240. The connecting rod 240 is preferably secured to the seat tube 40 of the foldable bicycle 10 by, for example, a weld, although other securing devices and locations may be used.

A hinge assembly 150 is provided to rotatably or pivotally mount the plate 110 to one or more of the elements being secured by the securing apparatus 20. In the foldable bicycle embodiment, the hinge assembly 150 is used to secure the plate 110 to the frame of the bicycle 10, such as on one or more of the top tubes 50, seat tube 40 or the down tube assembly 30. In the illustrated embodiment, the hinge assembly 150 hingedly connects the plate 110 to the top tube assembly 50. The hinge 150 enables the hinged plate 110 to rotate in directions toward and away from the top tubes 50 described in further detail below.

A biasing assembly is provided to bias the plate 110 in a desired, i.e. locked position. In the illustrated embodiment, a spring 140 is used to provide the biasing force, although it should be understood that any form of biasing device may be used, such as linear or torsional springs (leaf springs), magnetic elements and so on. In the illustrated embodiment, the plate 110 includes a mounting location for one end of the biasing member, i.e. spring 140. The spring is attached to the plate 110 at a first aperture 130, also referred to as a first eyelet 130 situated on the raised portion 120. It should be understood that the biasing assembly may be situated to link with the plate 110 at any location or locations that can provide sufficient biasing force to bias the plate 110 in the desired direction.

In the illustrated embodiment, the spring 140 is anchored at another end of the spring to the seat tube 40. Again, it should be understood that any desired anchoring location may be used, such that a sufficient anchoring strength is provided adequately to anchor the biasing assembly. In the illustrated embodiment, the spring is mounted at mounting location 200 on the seat tube 40. This mounting location 200 eyelet is referred to as the second eyelet.

In the illustrated embodiment, the plate 110 is hinged at location 150 whereby the biasing assembly exerts a torsional force on the plate 110 biasing it in the desired direction. In the illustrated embodiment, the direction is rotational and generally downwards, toward the top tube assembly 50 about the hinge 150. It should be noted that although a rotational biasing direction is illustrated, whereby the biasing assembly imparts the biasing force at a single location (the first eyelet 130) spatially separated from the corresponding pivot location, about hinge 150, in other embodiments, multi-point forces can be provided by the biasing assembly. For example, the biasing assembly can alternatively provide force at two or more separated location such as to provide a linear bias in a desired direction, or the rotational bias already discussed, by way of example.

Figure 4:
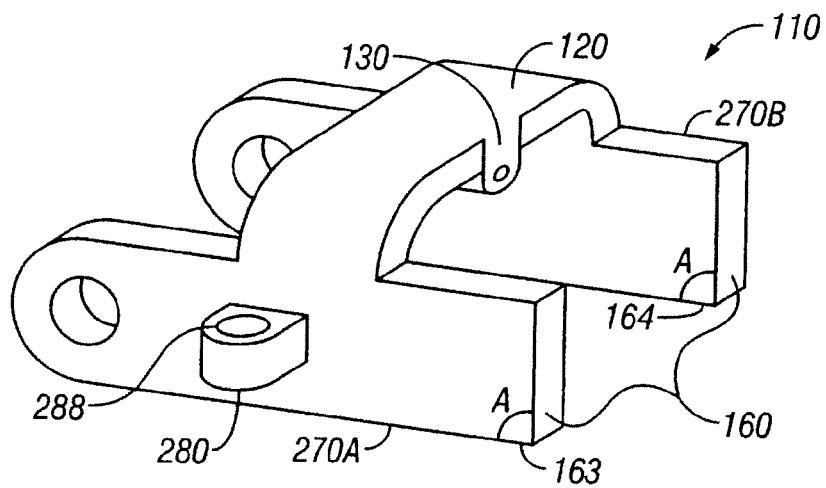
FIG. 4 is a top perspective view of a hinged plate of a securing apparatus in accordance with one embodiment of the present invention.
Figure 5:
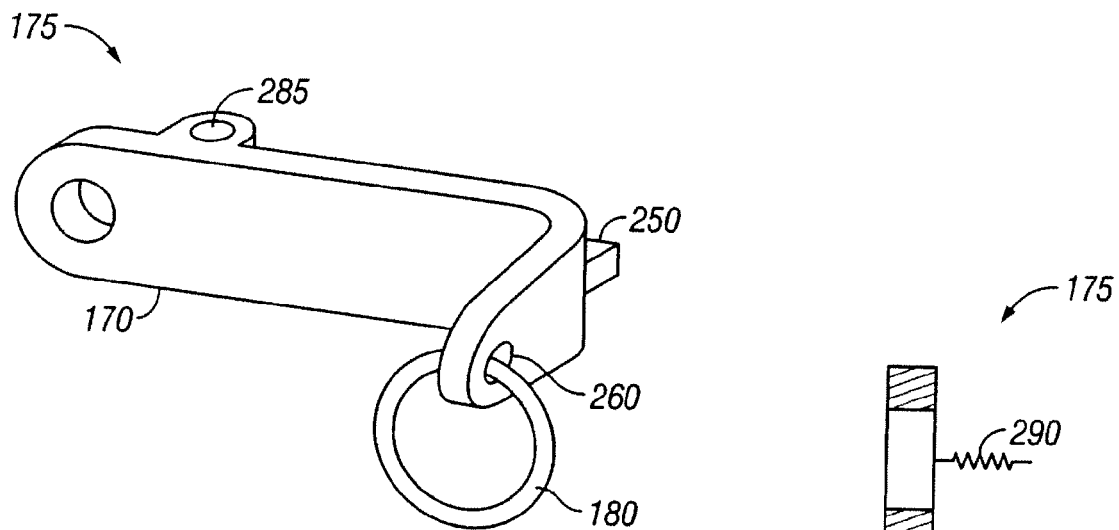
FIG. 5 is a top perspective view of a locking member of a securing apparatus in accordance with one embodiment of the present invention.

In one embodiment, the hinged plate 110 optionally includes abutment surfaces 160 that engage corresponding engagement surfaces 165 on other elements. Preferably each of the abutment surfaces 160 is a generally flat surface that has a matching (i.e. opposite) angle to that of the corresponding engagement surface 165. The angle selected (illustrated as angle "A" in FIG. 4) can be any angle, but preferably is slightly off of perpendicular with respect to a corresponding adjacent surface, illustrated with reference numbers 163 and 164 in FIG. 4. Preferably the angle is between 80 and 100 degrees, although it should be appreciated that any desired angle can be used, even perpendicular or angles substantially off of perpendicular, so long as the corresponding end surfaces 165 are provided at a mating orientation, whereby they exert opposing forces upon one another when the plate is in a locked position. The abutment surfaces 160 can be at any location on the hinged plate 110 such that they can impinge upon the corresponding engagement surfaces 165. In the illustrated embodiment, they are at respective ends of extension members 270A, 270B.

In the illustrated embodiment, the corresponding engagement surfaces 165 are provided on respective ends of seat stays 100. The engagement surfaces 165 of the seat stays 100 also include the optionally curved connector portion 230, which can have any shape and optionally include dropouts that engage the connecting rod 240. As illustrated in greater detail in FIGS. 10 and 11, the inner surface portion 235 of the connector portion 230 is shaped to engage and retain the seat stays in fixed relation to the connecting rod 240 when locked, such as by using the securing apparatus 20. The outer surface portion 237 in the illustrated embodiment includes a substantially curved shape.

The connecting rod 240 can be fixedly attached to the bicycle frame in any fashion. In the illustrated embodiment, it is attached to the seat tube 40, such as by welding, or any other fastening technique or apparatus.

The connecting rod 240 preferably also includes recesses 300 to assist in positioning the connectors 230 when they engage the rod 240. The seat stays 100 preferably form part of a foldable rear-wheel assembly 90 of the foldable bicycle 10. When the foldable bicycle 10 is an unfolded or a riding position, the connector portion 230 connects to the connecting rod 240 such as by positioning each of the connector portions 230 into the corresponding recess 300 such that the inner surface portion 235 receives a portion of connecting rod 240.

The abutment surfaces 160 of the plate 110 abut the corresponding engagement surfaces 165 of the seat stays 100 and the opposed forces exerted by the abutment surfaces 160 and the seat stays 100 (such as at engagement surfaces 165) on each other serve to maintain the securing apparatus 20 in an engaged and locked position. It should be noted that the outer surface 237 can be shaped to assist in positioning the seat stays 100 into the secured position. In the illustrated embodiment, the outer surface(s) 237 are curved so as to slidably engage the securing apparatus 20 at or near the abutment surfaces 160.

Optionally, a locking assembly 175 including locking member 170, and related apparatus described below, is provided to secure the securing apparatus 20 in the engaged position. The locking member 170 includes engagement portion 250 (shown in FIG. 3) that is positionable at least partially adjacent (for example, beneath as shown in the illustrations) at least one of the abutment surfaces 160. The locking member 170 is movably mounted such that the engagement portion 250 can be moved to its secured position adjacent at least one of the abutment surfaces 160, to an unlocked position where it is clear of the abutment surfaces 160. Preferably, the locking member 170 is rotatably mounted such that the engagement portion 250 can be rotated into and out of its secured, or locked, position. In the illustrated embodiment, the locking member 170 is pivotally mounted to the locking plate 110, such as at the pivoting assembly 289 of the locking assembly 175. The locking plate 110 is hingedly mounted to one of the components via hinge assembly 150 providing for motion in a first rotational direction. The locking member 170 is pivotally mounted to the locking plate 110 in a second rotational direction via the pivoting assembly 289. In the illustrated embodiment, the first and second rotational directions are orthogonal or perpendicular to one another, although it should be understood that different angular relationships may be selected so long as the abutment surfaces 160 of the locking plate 110 can be moved and the locking member 170 can be moved into and out of the secured position. Likewise, other movable mounting structures that allow either the locking member 170 and/or the locking plate 110 to move as desired can be used, such as linear or sliding linkages. It also should be noted that "pivoting", "hinge" and "rotating", and "pivotally", "hingedly" and "rotatably" are used in this description interchangeably; the word "hinge assembly" 150 and "pivoting assembly" 289 are described with different words so as to distinguish them, but use of the different words does not mean that they are performing different functions in different ways, although optionally different mechanisms may be used to achieve the hinged connections.

In the illustrated embodiment, the pivoting assembly 289 includes a screw or hinge pin (not shown) that is inserted through aperture 285 in hinge post 287 and a corresponding aperture 288 in hinge mount 280, providing a pivotable mount of the locking member 170 to the plate 110.

In the fully engaged and locked position of the securing apparatus 20, the locking member is positioned so that its engagement portion 250 is slid adjacent at least one of the locations where the abutment surfaces 160 abut corresponding respective engagement surfaces 165. For example, the engagement portion 250 of the locking member optionally can extend to overlap partially with one of the abutment surfaces 160 and corresponding engagement surface 165 or alternatively can overlap fully with one of the abutment surfaces 160 and corresponding engagement surface 165, or alternatively can extend to overlap with two of the abutment surfaces 160 and corresponding two engagement surfaces 165 and so on. Any size or shape engagement portion 250 can be provided that will extend sufficiently adjacent the locking plate 110 such that it acts to retain the plate 110 in an engaged position. Thus, the engagement portion 250 of the locking member 170 aids in maintaining the securing apparatus 20 and the seat stays 100 in a desired position by reducing movement of the hinged plate 110, and the seat stays 100.

It should be noted that in an alternative embodiment of the invention, a locking mechanism including locking member 170, engagement portion 250 and associated optional hinge and biasing elements are not required. Instead, in this alternative embodiment, the plate 110 and the forces applied by surfaces 160 and 165 on each other are sufficient to secure the components being releasably secured.

Figure 3:
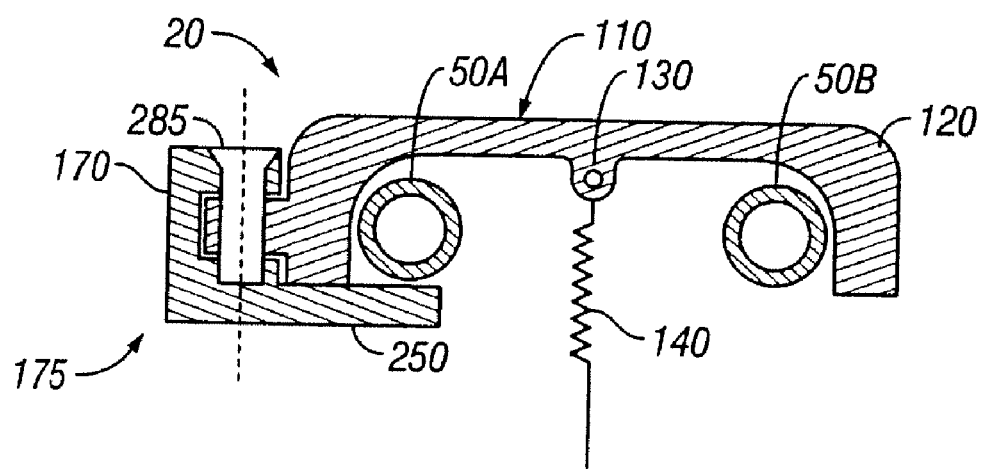
FIG. 3 is a cross-sectional view of the securing apparatus taken along line 3-3 as shown in FIG. 2, in accordance with one embodiment of the present invention.

FIG. 3 illustrates a cross-section of the securing apparatus 20 as taken along line 3-3 shown in FIG. 2. In this illustration, the top tube assembly 50 includes tube 50A and 50B, and the engagement portion 250 of the locking member 170 extends at least partially beneath plate 110. The locking member 170 optionally includes a grappling structure 180 that a user can use to assist in grasping and moving the locking member 170. Optionally the grappling structure is a pull ring 180, which is mounted via an optional third eyelet 260. The pull ring 180 optionally can be used to assist an operator in grasping and rotating the locking member 170 about a pivot axis. Although an eyelet 260 and ring 180 are illustrated as one example of a structure to assist the operator in grasping and pulling on the locking member, it should be appreciated that any grappling structure may be provided, such as tabs, hooks, indentations, etc., that allows an operator to grasp and move the locking member 170 about its pivot axis.

Figure 6:
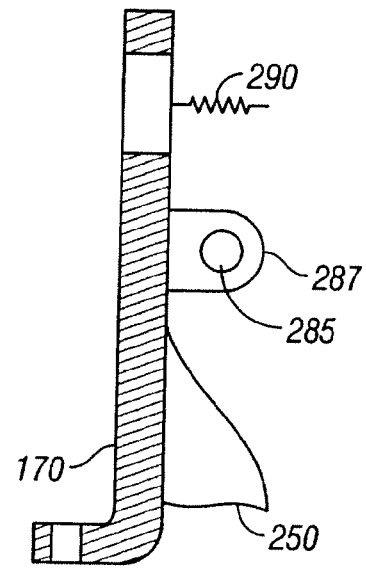
FIG. 6 is a top cross-sectional view of the locking member shown in FIG. 5, in accordance with one embodiment of the present invention.

In one embodiment, the locking member 170 is spring biased so that the engagement portion 250 is biased towards the plate 110, i.e. towards its secured, or locked, position. An example of a biasing mechanism 290 is illustrated in FIG. 6, in which a spring is used to push one end of the locking member 170 away from the locking plate 110, wherein the spring engages the locking member 170 on the opposite side of the pivot axis from the engagement portion 250, thereby biasing the engagement portion in the opposite direction, namely towards the plate 110.

It should be appreciated that any type of biasing assembly can be used that biases the locking member in the desired direction. For example torsional forces can be applied via leave springs mounted in a desired location, or in the pivot assembly. Alternatively, linear biasing forces can be applied at any desired location, such as illustrated, or alternatively on the other side of the pivot assembly, i.e. the engagement portion 250 side, whereby the linear bias would be applied towards the plate 110. The pivot biasing assembly 290 assists in maintaining the engagement portion 250 so that it is at least partially beneath the mechanical elements being releasably secured when in a locked position. This is achieved because the pivot biasing member 290 urges the engagement portion 250 of the locking member 170 adjacent the pull-ring 180 towards the hinged plate 110.

Figure 7:
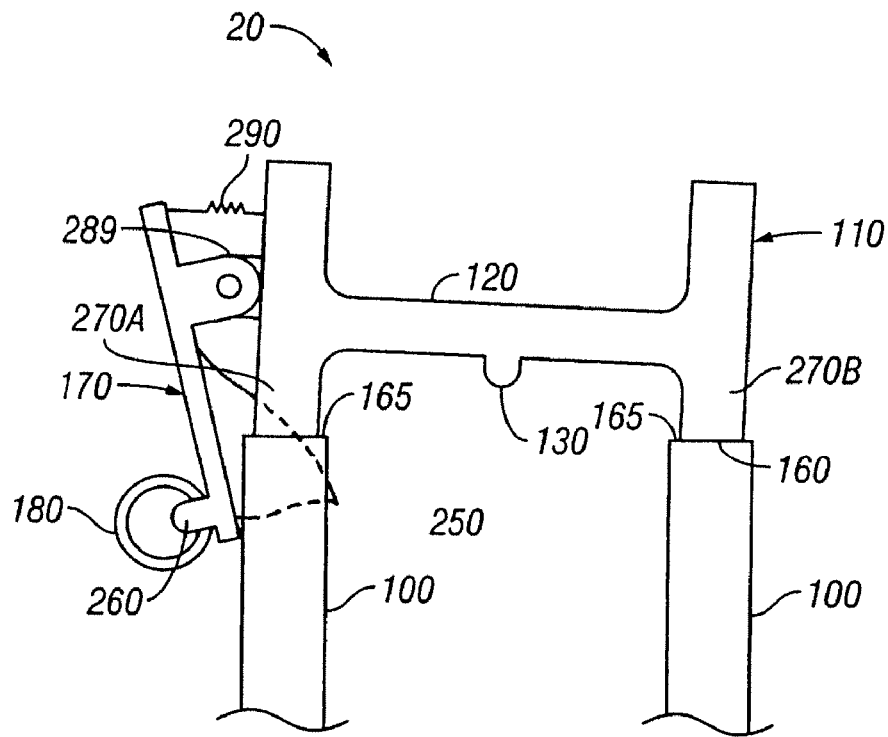
FIG. 7 is a top view of a securing apparatus in an engaged position on a foldable bicycle in accordance with one embodiment of the present invention.
Figure 8:
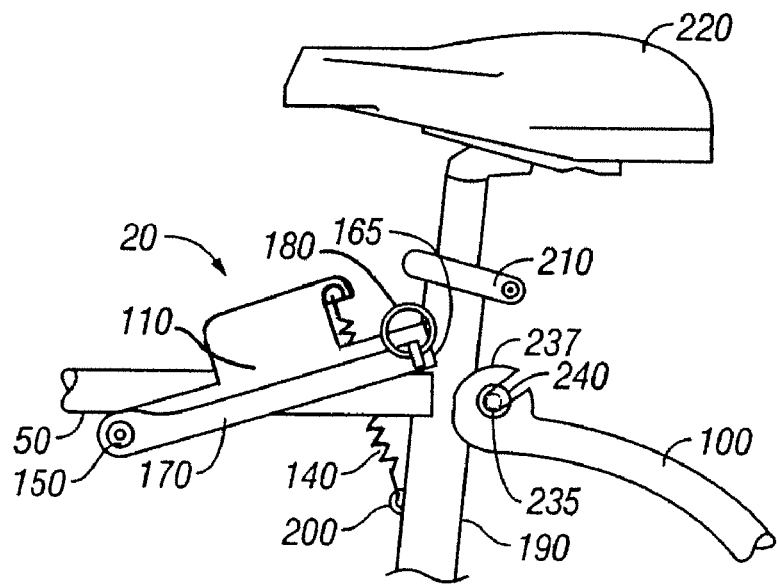
FIG. 8 is a side view of a securing apparatus in a disengaged position mounted on a foldable bicycle in accordance with one embodiment of the present invention.
Figure 9:
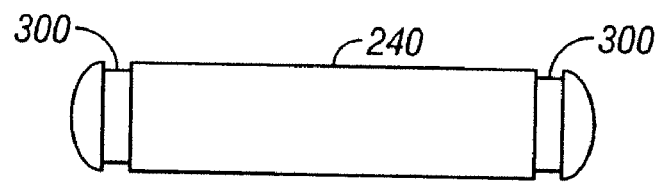
FIG. 9 is a side view of a seat stay connecting rod in accordance with one embodiment of the present invention.

Illustrations showing the operation of an illustrated embodiment of the securing apparatus of the present invention can be found in FIGS. 7 and 8. FIG. 7 shows a perspective view of the securing apparatus 20 in an engaged, locked position, and FIG. 8 illustrates the securing apparatus 20 in a disengaged, unlocked position. When in the engaged, locked position, the abutment surfaces 160 of the hinged plate 110 abut corresponding engagement surfaces 165. The protruding engagement portion 250 of the locking member 170 extends beneath one of the abutment surfaces 160 in the illustration. An end portion of the engagement portion 250 is shown in solid lines extending into the space between the two illustrated abutment surfaces 160. A portion of the engagement portion 250 that is beneath the abutment surface 160 and a portion of seat stay 100, and the engagement surface 165 of seat stay 100, is illustrated in broken lines.

The pivot biasing assembly 290 attaches to a portion of the locking member 170 that is on the opposite side of the pivot assembly (shown with number 289) from the engagement portion 250. The biasing assembly 290 also is mounted to the plate 110. The force exerted by biasing assembly 290 on the locking member 170 is directed away from the plate 110 and thereby biases the engagement portion 250 towards and beneath the abutment surface 160 (and seat stay 100 and engagement surface 165), acting to bias at least a portion of the engagement portion 250 in the locked position.

The pull-ring 180 may be used to rotate the locking member 170 about the pivot mounting assembly 289. By rotating the locking member 170 sufficiently away from the hinged plate 110, the engagement portion 250 no longer extends beneath the seat stays 100 and the hinged plate 110. The securing apparatus 20 may then be released as described in further detail below.

The locking member 170 is in an unlocked position when the engagement portion 250 is not located beneath the abutment surfaces 160 and the corresponding extension members 270A, 270B of the hinged plate 110. This may be performed using the pull-ring 180 as described above.

In order to disengage the securing apparatus 20, the locking member 170 is moved to an unlocked position, and the hinged plate 110 is moved to the disengaged position, i.e., hinged plate 110 is disengaged from the linked component. In the illustrated embodiment, the linked component includes the seat stays 100. In disengaging the securing apparatus, the hinged plate is rotated about hinge assembly 150 so that the abutment surfaces 160 disengage their corresponding engagement surfaces 165 on the seat stays 100. This allows the seat stays to move freely in their natural folding direction, which in the illustrated embodiment is towards and overlapping with seat tube 40. Thus, the seat stays 100 and the rear wheel assembly 90 are released and free to move in the direction previously blocked by the hinged plate 110, and specifically blocked by the engagement between abutment surfaces 160 and engagement surfaces 165.

In the disengaged position, the hinged plate 110 may be rotated in an upward direction about the hinge 150. The hinged plate 110 may be rotated such that abutment surfaces 160 are no longer in contact with the engagement surfaces 165 on the end portions of the seat stays 100. Alternatively, the abutment surfaces 160 may abut the end portions of the seat stays, however, the hinged plate 110 may be fairly easily rotatable because the abutment surfaces 160 and the seat stays 100 exert only minor forces on each other.

Figure 10:
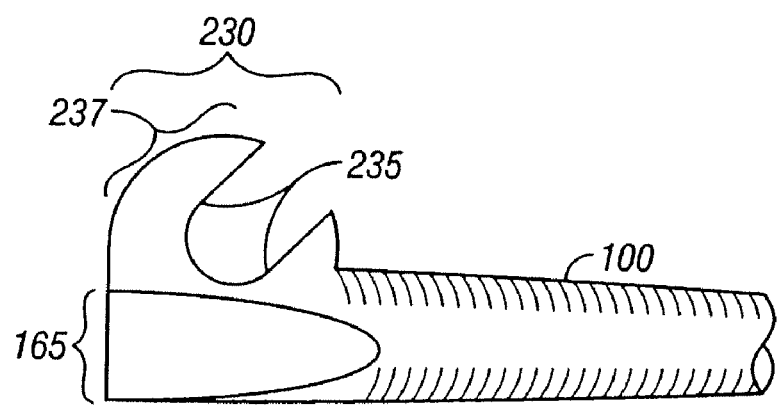
FIG. 10 is a side view of an end portion of a seat stay of a foldable bicycle in accordance with one embodiment of the present invention.
Figure 11:
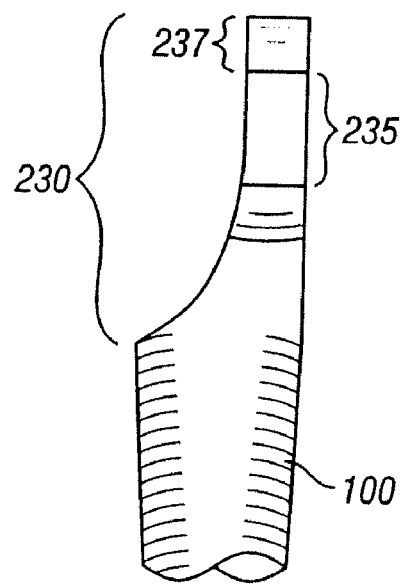
FIG. 11 is a top view of an end portion of a seat stay of a foldable bicycle in accordance with one embodiment of the present invention.

FIGS. 10 and 11 provide exemplary detail views of a seat stay 100 of a foldable bicycle having a connector portion 230 according to one embodiment of the invention. The connector portion 230 is preferably inserted into the notches, or recesses, 300 of the connecting rod 240. The notches 300 assist to maintain the connector portion 230 in a desired position.

Figure 12:
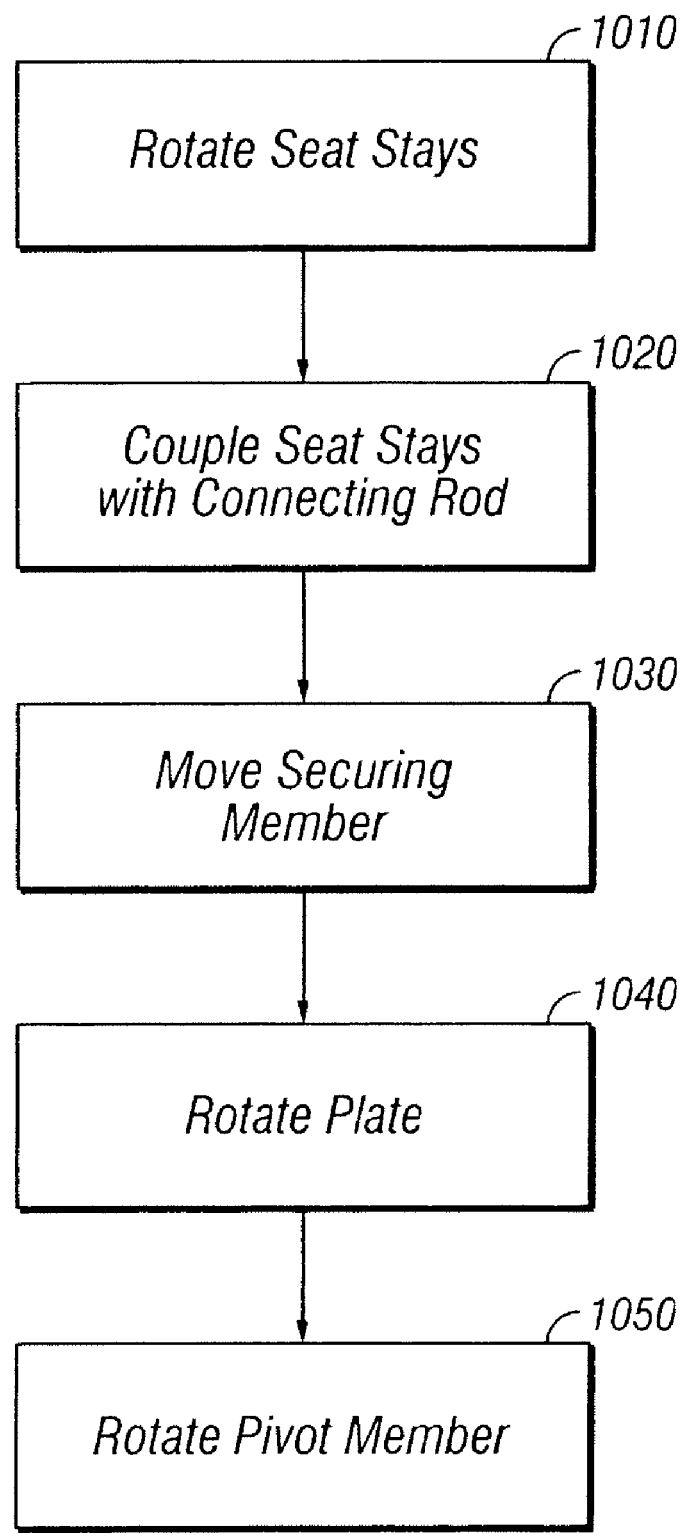
FIG. 12 is a block diagram of a method of assembling a portion of a foldable bicycle using a securing apparatus in accordance with one embodiment of the present invention.

The method of the present invention now will be described in greater detail with reference to FIG. 12. FIG. 12 illustrates a method of assembling a foldable bicycle 10 using a securing apparatus 20 according to one embodiment of the present invention. In step 1010, the seat stays 100 of the foldable bicycle are rotated from the folded position in a direction such that connector portions 230 are moved toward seat tube 40 about the pivot axis 105 of the rear wheel assembly 90. In step 1020, connector portions 230 of the seat stays 100 are coupled with connecting rod 240, such as in the engagement recesses 300. In step 1030, the locking member 170 is rotated about its pivot axis in the pivot assembly 289 such that the engagement portion 250 is clear of the abutment surfaces 160, putting the assembly in condition for moving into a locked position. This may be performed by pulling on pull-ring 180 with sufficient force to overcome the bias force from biasing assembly 290, or alternatively by impinging on surface 237. In step 1040, the hinged plate 110 of the securing apparatus 20 is rotated about its hinge 150 such that abutment surfaces 160 are urged into mating position with corresponding engagement surfaces 165 of the seat stays 100. This can be accomplished by allowing the spring force exerted by biasing mechanism 140 to operate to urge the plate 110 into the desired orientation, and alternatively the operator can assist this motion, such as by pulling downward on ring 180 or by pushing downward on the plate 110. This step is continued until the securing apparatus reaches an engaged and locked position. As a result of this operation, the seat stays 100 and the plate 110 exert linear opposing forces upon one another.

In step 1050, the locking member 170 is rotated about its pivot axis in the pivot assembly 289 such that the engagement portion 250 is under at least one of the abutment surfaces 160, thereby locking the plate 110 from rotating away from the engagement position where surfaces 160 and 165 abut one another. This can be performed by releasing the pull-ring 180 allowing the biasing forces imparted by biasing assembly 290 to act to pivot the locking member about its axis of rotation. In some instances, an operator may push on the ring 180 or a portion of the locking member 170 to assist its movement into the locking position. It should be appreciated that the method steps discussed herein can be performed in any order that can accomplish a securing or unsecuring operation. For example, the steps in a securing operation can alternatively be performed in which step 1030 is performed at the same time as or otherwise overlapping with step 1040.

In one possible mode of operation of unfolding or assembling foldable bicycle 10, as the seat stays 100 of the rear wheel assembly are positioned, as indicated in reference number 1010, the leading edges 237 of the connector portions 230 of the seat stays 100 impinge upon the plate 110 at or near the abutment surfaces 160 and exert a force upon the plate 110 that acts as a torque expressed about the hinge 150 causing displacement at the respective ends of the extension members 270A and 270B having the abutment surfaces 160. Thus, in step 1010, optionally, the plate 110 is displaced by virtue of positioning of the seat stays 100. In this mode of operation, the extension members 270A and 270B move upwards under the forces exerted by the leading edges 237 of the seat stays 100 while the opposite end of the plate 110 remains pivotally mounted at hinge 150. In other words, the leading edges 237 slide on the lower edges of extension members 270A and 270B, which also are at or near the respective abutment surfaces 160. This movement pushes the plate 110 upwards at that location. When the leading edges 237 slide past the lower edges of the extension members 270A and 270B as far as possible, the inner surfaces 235 also are then seated in the respective recesses 300 of the connecting rod 240, as indicated in the exemplary step 1020. At or close to the end of the movement of the end portions 230 of the seat stays 100 (which include the surfaces 235, 237), extension members 270A and 270B are free of the leading edges and become free to move back to a resting position as indicated by step 1040.

Although this discussion concerns impingement of surface 237 on the plate 110, it should be understood that in an alternative mode of operation, the engagement portion 250 of the locking member 170 has not been retracted, such as by pulling on ring 180. In such a mode of operation the plate 110 is moved by virtue of the surface 237 impinging upon a portion of the engagement portion 250.

Preferably the plate is biased towards the resting position by biasing assembly 140 as well as previously discussed—allowing the plate 110 to rebound downward to its resting position—which will be as far as the mating abutment surfaces 160 and engagement surfaces 165 are structured to permit. In an embodiment in which the engagement portion 250 has been retracted, such as by pulling on the ring 180, once the lower edge of the plate 110 is clear of the engagement portion 250 of the locking member 170, the locking member 170 can return to its resting position, such as the position biased by biasing assembly 290, whereby it locks the securing apparatus and seat stays from further motion, as indicated in step 1050. Optionally a biasing assembly is not provided and a user can manually operate the securing apparatus 20 to return the plate to its resting position.

In an embodiment in which the engagement surface has not been retracted, it should be understood that a step of rotating the plate 1040 downward can serve to impinge a surface of the engagement portion 250 with edge 237. In such an embodiment, it is preferred that the engagement portion has a curved profile whereby the contact forces urge it outwards, i.e., the contact forces rotate the locking member about the pivot axis of pivot assembly 289. Once the engagement portion 250 is clear of the bottom edge of the end portion of the seat stay 100, it can then snap back to the secured position by virtue of operation of biasing assembly 290, or by manual operation, as indicated in step 1050.

Unlocking and disengaging the securing mechanism and folding a bicycle 10 of the present invention can be accomplished by performing the steps illustrated in FIG. 12, in opposite order. In other words, the assembly is unlocked by rotating the locking member (1050), until the engagement portion 250 is clear of the plate 110 and seat stays 100, then pulling up on the plate 110, i.e. rotating it out of engagement with the engagement surfaces 165 (1040), and optionally releasing the locking member to return it to its resting position as biased by the biasing assembly 290 (1030). The next step is uncoupling the seat stays (1020) from the connector rod 240, and finally folding the bicycle as desired, such as by folding the rear wheel assembly 90 (1010) and optionally folding the front wheel assembly 80 and handlebar assembly 70 as desired.

Thus, it is seen that a releasable securing apparatus is provided. One skilled in the art will appreciate that the present invention can be practiced by other than the above-described embodiments, which are presented in this description for purposes of illustration and not of limitation. The description and examples set forth in this specification and associated drawings only set forth embodiment(s) of the present invention. The specification and drawings are not intended to limit the exclusionary scope of this patent document. Many designs other than the above-described embodiments will fall within the literal and/or legal scope of the following claims, and the present invention is limited only by the claims that follow. It is noted that various equivalents for the particular embodiments discussed in this description may practice the invention as well.

What is claimed is:

1. A foldable bicycle having a releasable securing apparatus releasably securing at least one seat stay to another frame element of the bicycle comprising:
   an elongate securing member moveably mounted to the frame element at a hinge, the hinge having a first axis of rotation that is generally parallel to axes of rotation of rotating wheels of the foldable bicycle, the securing member having an abutment surface;
   wherein the at least one seat stay is configured to pivot relative to the frame element such that the at least one seat stay is movable between a riding position and a folded position;
   wherein the abutment surface and an engagement surface of the at least one seat stay abut and exert opposing forces on each other such that the securing member is pressed between the hinge and the engagement surface when the securing member is in an engaged position and the at least one seat stay is in the riding position.

2. The foldable bicycle of claim 1, further comprising a locking assembly including a locking member movably mounted to the securing member, wherein the locking member prevents relative motion between the securing member and the frame element when the locking member is in a locked position.

3. A foldable bicycle having a releasable securing apparatus, comprising:
   a foldable bicycle frame including a frame element;
   at least one seat stay that is configured to pivot relative to the frame element, the at least one seat stay being movable relative to the frame element between a riding position and a folded position; and
   a securing member movably coupled to the frame element at a hinge assembly, the securing member having at least one abutment surface that abuts an engagement surface of the at least one seat stay such that the securing member is pressed between the hinge assembly and the engagement surface when the at least one seat stay is in the riding position and the securing member is in an engaged position, and the abutment surface being moved out of abutment with the engagement surface in a disengaged position.

4. A foldable bicycle having a releasable securing apparatus releasably securing at least one seat stay assembly to another frame element of the bicycle comprising:
   a securing member moveably mounted to the frame element at a hinge, the securing member having an abutment surface;
   wherein the at least one seat stay assembly is configured to pivot relative to the frame element such that the at least one seat stay assembly is movable between a riding position and a folded position;
   wherein the abutment surface and an engagement surface of the at least one seat stay assembly abut and exert opposing forces on each other such that the securing member is pressed between the hinge and the engagement surface when the securing member is in an engaged position and the at least one seat stay assembly is in the riding position.

5. A method of folding a foldable bicycle having a releasable securing apparatus releasably securing at least one seat stay to another frame element of the bicycle, comprising the steps of:
   providing a securing member moveably mounted to the frame element at a hinge that has a first axis of rotation that is generally parallel to axes of rotation of rotating wheels of the foldable bicycle, the securing member having an abutment surface;
   configuring the at least one seat stay to pivot relative to the frame element such that the at least one seat stay is movable between a riding position and a folded position;
   providing an engagement surface of the at least one seat stay such that the engagement surface and the abutment surface abut and exert opposing forces on each other such that the securing member is pressed between the hinge and the engagement surface when the securing member is in an engaged position and the at least one seat stay is in the riding position.

6. A foldable bicycle having a releasable securing apparatus releasably securing a first frame element to a second frame element of the bicycle comprising:

a securing member pivotably mounted to the first frame element at a hinge, the securing member having an abutment surface;

wherein the second frame element is configured to move relative to the first frame element such that the second frame element is movable between a riding position and a folded position;

wherein the abutment surface and an engagement surface of the second frame element abut and exert opposing forces on each other such that the securing member is pressed between the hinge and the engagement surface when the releasable securing apparatus is in an engaged position and the second frame element is in the riding position.

7. The foldable bicycle of claim 6 wherein the second frame element is a bicycle seat stay and the engagement surface is located at the end of the seat stay.

8. The foldable bicycle of claim 6 wherein the second frame element includes two bicycle seat stays and the engagement surface includes two spatially separated surfaces at the respective ends of the two bicycle seat stays.

9. The foldable bicycle of claim 6 wherein the first frame element is a bicycle top tube.

10. A releasable securing apparatus releasably securing at least two mechanical components comprising:

a securing member pivotably mounted to a first component at a hinge, the securing member having an abutment surface;

wherein a second component includes an engagement surface and is configured to move relative to the first component; and wherein the abutment surface and the engagement surface abut and exert opposing forces on each other such that the securing member is pressed between the hinge and the engagement surface when the securing member is in a secured position.

11. The releasable securing apparatus of claim 10 wherein the first component is a bicycle top tube.

12. The releasable securing apparatus of claim 10 wherein the second component is a bicycle seat stay and the engagement surface is located at the end of the seat stay.

* * * * *